(12) United States Patent
Budnick et al.

(10) Patent No.: US 11,032,655 B1
(45) Date of Patent: Jun. 8, 2021

(54) ELECTRONIC DEVICE THAT LIMITS ELECTROMAGNETIC EMISSIONS FROM MULTIPLE BATTERIES

(71) Applicant: MOTOROLA MOBILITY LLC, Chicago, IL (US)

(72) Inventors: Dennis J. Budnick, Richmond, IL (US); Mark J. Carlson, Arlington Heights, IL (US); Hyuck Joo Kwon, Buffalo Grove, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/845,879

(22) Filed: Apr. 10, 2020

(51) Int. Cl.
H04R 25/00 (2006.01)
H04M 1/247 (2021.01)
H04M 1/72478 (2021.01)

(52) U.S. Cl.
CPC ......... *H04R 25/602* (2013.01); *H04R 25/305* (2013.01); *H04R 25/603* (2019.05)

(58) Field of Classification Search
CPC .. H04R 25/602; H04R 25/603; H04R 25/305; H04R 25/30; H04R 25/45; H04R 25/453; H04R 2225/49; H04R 2225/55; H04R 2225/61; H04M 1/2475; H04M 1/72478
See application file for complete search history.

(56) References Cited

U.S. PATENT DOCUMENTS

| | | | | |
|---|---|---|---|---|
| 7,773,943 B2* | 8/2010 | Zurek | ................... | H04R 25/554 455/41.1 |
| 2013/0034234 A1* | 2/2013 | Chen | .................... | H04R 25/554 381/58 |
| 2014/0376755 A1* | 12/2014 | Kang | ................... | H04R 25/558 381/321 |

* cited by examiner

*Primary Examiner* — Mark Fischer
(74) *Attorney, Agent, or Firm* — Isidore PLLC

(57) ABSTRACT

An electronic device, method, and computer program product enable limiting electromagnetic emissions from current between batteries. A first battery is positioned proximal to an earpiece speaker within the electronic device. At least one second battery is positioned at a different location within the electronic device that is not proximal to the earpiece speaker. A controller is electrically connected to a switch that is electrically connected in-line with the first battery. The controller selectively toggles the switch between first and second switches state. The controller initiates activation of a first software mode of the electronic device corresponding to operation of the earpiece speaker. In response to detecting the activation, the controller toggles the switch to the first switch state in which the switch limits current drawn from the first battery while the electronic device is in the first software mode, thus reducing baseband electromagnetic emissions emanating from the first battery.

20 Claims, 6 Drawing Sheets

ELECTRONIC DEVICE THAT LIMITS ELECTROMAGNETIC EMISSIONS FROM MULTIPLE BATTERIES

1. TECHNICAL FIELD

The present disclosure relates generally to wireless communications and, more particularly, to wireless communication devices that are hearing aid compatible.

2. DESCRIPTION OF THE RELATED ART

While the hearing aid industry has made progress in shielding hearing aids against radio frequency (RF) noise, audio transducers within the hearing aids are still susceptible to noise in the form of low frequency magnetic fields. In particular, the audio transducers typically include telecoil couplers that receive signals via an induction field generated by an induction coupler. Often locations like theaters, grocery store check-out lanes, and government offices install induction couplers that create a hearing loop to assist people with hearing aids that are telecoil equipped. Low frequency magnetic field noise sometimes exists in the same frequency band as the generated induction field. This noise couples to the telecoil couplers, thereby degrading their signal quality.

Communication devices such as smartphones that are used in proximity to hearing aids are increasingly called upon to incorporate hearing aid compatibility (HAC), in order to reduce sources of electromagnetic noise that would interfere with a hearing aid. Certain communication devices that have a "flip" form factor of a thin housing with two portions that unfold to open and fold to close. Flip form factor present a particular challenge for HAC. Providing sufficient battery power for a flip phone requires having separate batteries within a base housing and a movable housing. Electrical current transferring between the two batteries generates low frequency electromagnetic noise that is picked up by a hearing aid, especially when the movable housing of the flip phone is placed close to the hearing aid during a communication session.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
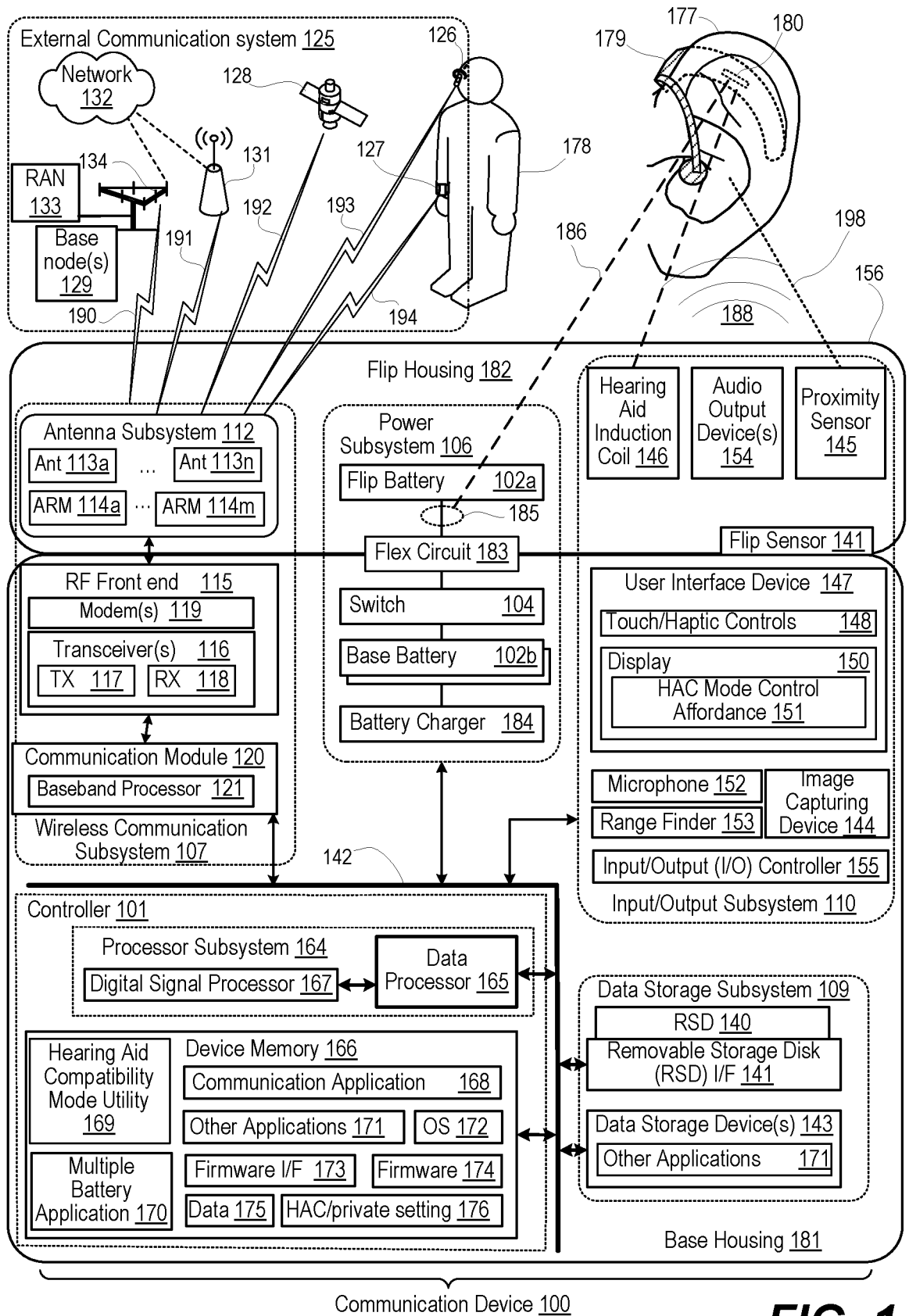
FIG. 1 illustrates a functional block diagram of a communication device powered by multiple batteries having current flow mitigation features for limiting electromagnetic emissions, according to one or more embodiments.

According to aspects of the present disclosure, an electronic device, a method and a computer program product enable limiting of electromagnetic emissions from multiple batteries within the electronic device. The electronic device includes a first battery that is positioned proximal to an earpiece speaker within the electronic device. At least one second battery is positioned within the electronic device at a different location that is not proximal to the earpiece speaker. The electronic device includes a controller that is electrically connected to a switch, which is electrically connected in-line with the first battery. The controller selectively toggles the switch between a first switch state and a second switch state. The controller initiates activation of a first software mode of the electronic device corresponding to operation of the earpiece speaker of the electronic device. In response to the activation, the controller toggles the switch to a first switch state in which the switch limits current drawn from the first battery while the electronic device is in the first software mode, in order to reduce baseband electromagnetic emissions emanating from the first battery.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of example communication device 100 in an operating environment within which the features of the present disclosure are advantageously implemented. Communication device 100, managed by controller 101, is an example of an electronic device that limits electromagnetic noise caused by current flow between multiple batteries. In the illustrative embodiment, the multiple batteries are first battery 102a (located in the flip segment of the housing and also referred to herein as flip battery) and one or more second batteries 102b (located in a base segment and referred to herein as base batteries). The flip battery 102a and the one or more base batteries 102b are electrically connected in part by switch 104, which can selectively modulate current flow between batteries 102a-102b. In one or more embodiments, the electromagnetic noise is reduced to remain within a limit prescribed for hearing air compatibility (HAC).

Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In one or more embodiments, communication device 100 includes power subsystem 106, over-the-air (OTA) or wireless communication subsystem 107, data storage subsystem 109, and input/output subsystem 110, with each subsystem being managed by controller 101. Wireless communication subsystem 107 includes antenna subsystem 112 having antennas 113a-113n and antenna array modules (ARMs) 114a-114m. In one or more embodiments, antennas 113a-113n support lower frequency bands such as ultra-high band (UHB). ARMs 114a-114m support multiple input multiple output (MIMO) communication in higher frequency bands, such as millimeter Wave (mmWave). Wireless communication subsystem 107 includes RF front end 115 having transceiver(s) 116 that includes transmitter(s) ("TX") 117 and receiver(s) ("RX") 118. RF front end 115 further includes modem(s) 119. Wireless communication subsystem 107 includes communication module 120 having baseband processor 121. Baseband processor 121 communicates with controller 101 and RF front end 115. As described in more detail below, wireless communication subsystem 107 communicates with external communication system 125.

External communication system 125 can include devices such as wireless headset 126 and smart watch 127. External communication system 125 can include global positioning system (GPS) satellites 128, base node(s) 129, access node 131, and networks 132. Base node(s) 129, which correspond to radio access networks (RANs) 133, wirelessly transmit and receive communication via radio tower 134.

Data storage subsystem 109 of communication device 100 includes data storage device(s) 143. Controller 101 is communicatively connected, via system interlink 142, to data storage device(s) 143. Data storage subsystem 109 provides nonvolatile storage that is accessible by controller 101. For example, data storage subsystem 109 can provide a large selection of other applications 171 that can be loaded into device memory 166. In one or more embodiments, data storage device(s) 143 includes hard disk drives (HDDs), optical disk drives, solid state drives (SSDs), etc.

Data storage subsystem 109 of communication device 100 can include removable storage device(s) (RSD(s)) 140, which is received in RSD interface 141. Controller 101 is communicatively connected to RSD 140, via system interlink 142 and RSD interface (I/F) 141. In one or more embodiments, RSD 140 is a non-transitory computer program product or computer readable storage device. Controller 101 can access RSD 140 to provision communication device 100 with program code. When executed by controller 101, the program code causes or configures communication device 100 to provide the functionality described herein.

I/O subsystem 110 includes flip sensor 141, image capturing device 144, proximity sensor 145, and hearing aid induction coil 146. I/O subsystem 110 also includes user interface device(s) 147 having touch/haptic controls 148 and display 150. Display presents user settings, such as HAC mode control affordance 151. I/O subsystem 110 also includes microphone 152, range finder 153, and audio output device(s) 154. I/O subsystem 110 also includes I/O controller 155, which connects to peripheral devices external to housing 156 of communication device 100.

Controller 101 controls the various functions and/or operations of communication device 100. These functions and/or operations include, but are not limited to including, application data processing, communication with other electronic devices, navigation tasks, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 164, which includes one or more central processing units (CPUs), depicted as data processor 165. Processor subsystem 164 can include one or more digital signal processors 167 that are integrated with data processor 165 or are communicatively coupled to data processor 165. Data processor 165 is communicatively coupled, via system interlink 142, to device memory 166.

Device memory 166 includes applications such as communication application 168, HAC mode utility 169, multiple battery application 170, and other application(s) 171. Device memory 166 further includes operating system (OS) 172, firmware interface (I/F) 173, such as basic input/output system (BIOS) or Uniform Extensible Firmware Interface (UEFI), and other firmware 174. Device memory 166 includes data 175, such as HAC mode settings or private mode settings 176 used by multiple battery application 170 and other application(s) 171. Processor subsystem 164 of controller 101 executes program code to provide operating functionality of communication device 100. These software and/or firmware modules have varying functionality when their corresponding program code is executed by processor subsystem 164 or secondary processing devices within communication device 100. Processor subsystem 164 of controller 101 can execute program code of multiple battery application 170 to limit current drawn from flip battery 102a while communication device 100 is close to ear 177 of person 178, in order to reduce baseband electromagnetic emissions emanating from flip battery 102a. In one or more embodiments, the emissions are limited to remain within limits prescribed for HAC with hearing aid 179. In particular, hearing aid telecoil 180 of hearing aid 179 can be susceptible to emissions.

In one or more embodiments, controller 101 of communication device 100 is communicatively coupled via system interlink 142 to wireless communication subsystem 107, data storage subsystem 109, and input/output subsystem 110. System interlink 142 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 142) are illustrated in FIG. 1, it is to be understood that more, fewer, or different interconnections may be present in other embodiments.

Communication module 120 communicates with node node(s) 129 via uplink/downlink channels 190. Communication module 120 communicates with access node 131 via transmit/receive signals 191. Communication module 120 receives satellite broadcast signals 192 from GPS satellites 128. Communication module 120 communicates transmit/receive signals 193 with wireless headset 126. Communication module 120 communicates transmit/receive signals 194 with smart watch 127. Communication module 120 of wireless communication subsystem 107 operates in baseband frequency range to encode data for transmission and decode received data, according to a communication protocol. Modem(s) 119 modulate baseband encoded data from communication module 120 onto a carrier signal to provide a transmit signal that is amplified by transmitter(s) 117. Modem(s) 119 demodulates the received signal from base node(s) 129 or the received signal from access node 131. The received signal is detected by antenna subsystem 112. The received signal is amplified and filtered by receiver(s) 118, which demodulate received encoded data from a received carrier signal.

In one or more embodiments, controller 101, via wireless communication subsystem 107, performs multiple types of OTA or wireless communication with external communication system 125. Wireless communication subsystem 107 can communicate via Bluetooth connection with one or more personal access network (PAN) devices, such as wireless headset 126 and smart watch 127. Communication via Bluetooth connection includes both transmission and reception via a Bluetooth transceiver device. In one or more embodiments, wireless communication subsystem 107 communicates with one or more locally networked devices via a wireless local area network (WLAN) link provided by access node 131. In one or more embodiments, access node 131 supports communication using one or more IEEE 802.11 WLAN protocols. Access node 131 is connected to wide area network 132, such as the Internet. In one or more embodiments, wireless communication subsystem 107 communicates with GPS satellites 128 to obtain geospatial location information.

In one or more embodiments, communication device 100 has base housing 181 and a movable housing, referred to herein as flip housing 182. To accommodate power requirements within the available thin, two-piece design form of housing 156, power subsystem 106 includes flip battery 102a in flip housing 182. Flip battery 102a is electrically connected in parallel to the one or more base batteries 102b via a flex circuit 183 between base and flip housings 181-182 and via switch 104. Battery charger 184 charges flip and base batteries 102a-102b in unison to have essentially the same battery voltage. When flip and base batteries 102a-102b are not provided line current via battery charger 184, flip and base batteries 102a-102b generally discharge in synchronization. Small differences in voltage are equalized by electrical current flow 185 through flex circuit 183 and switch 104, causing electromagnetic emission 186. Controller 101 limits current flow 185 in response to one or more conditions: (i) controller 101 detects that HAC mode setting 176 is enabled; (ii) controller detects via flip sensor 141 that flip housing 182 is open; (iii) controller 101 determines that display 150 located in flip housing 182 is on; (iv) controller 101 determines that HAC mode or private mode settings 176 are enabled; (v) controller 101 determines that audio output device(s) 154 is an earpiece that is producing audio output 188; (vi) controller 101 determines, via proximity sensor 145 that detects reflected signal 198, that flip housing 182 is proximate to ear 177; (vii) controller 101 determines that hearing aid induction coil 146 is being used to communicate with hearing aid 179; (viii) controller 101 determines, via hearing aid induction coil 146, that hearing aid telecoil 180 is within detection range; and (ix) controller 101 determines, via wireless communication subsystem 107, that user 178 is proximate to flip battery 102a. The lossy dielectric nature of the human body causes a change in antenna performance that is detectable. Hearing aid induction coil 146 generates a magnetic field that inductively couples to the hearing aid telecoil 180, inducing a signal current. The inductive coupling is electrically detectable (within a detection range) as the power imparted to the magnetic loop changes.

Figure 2:
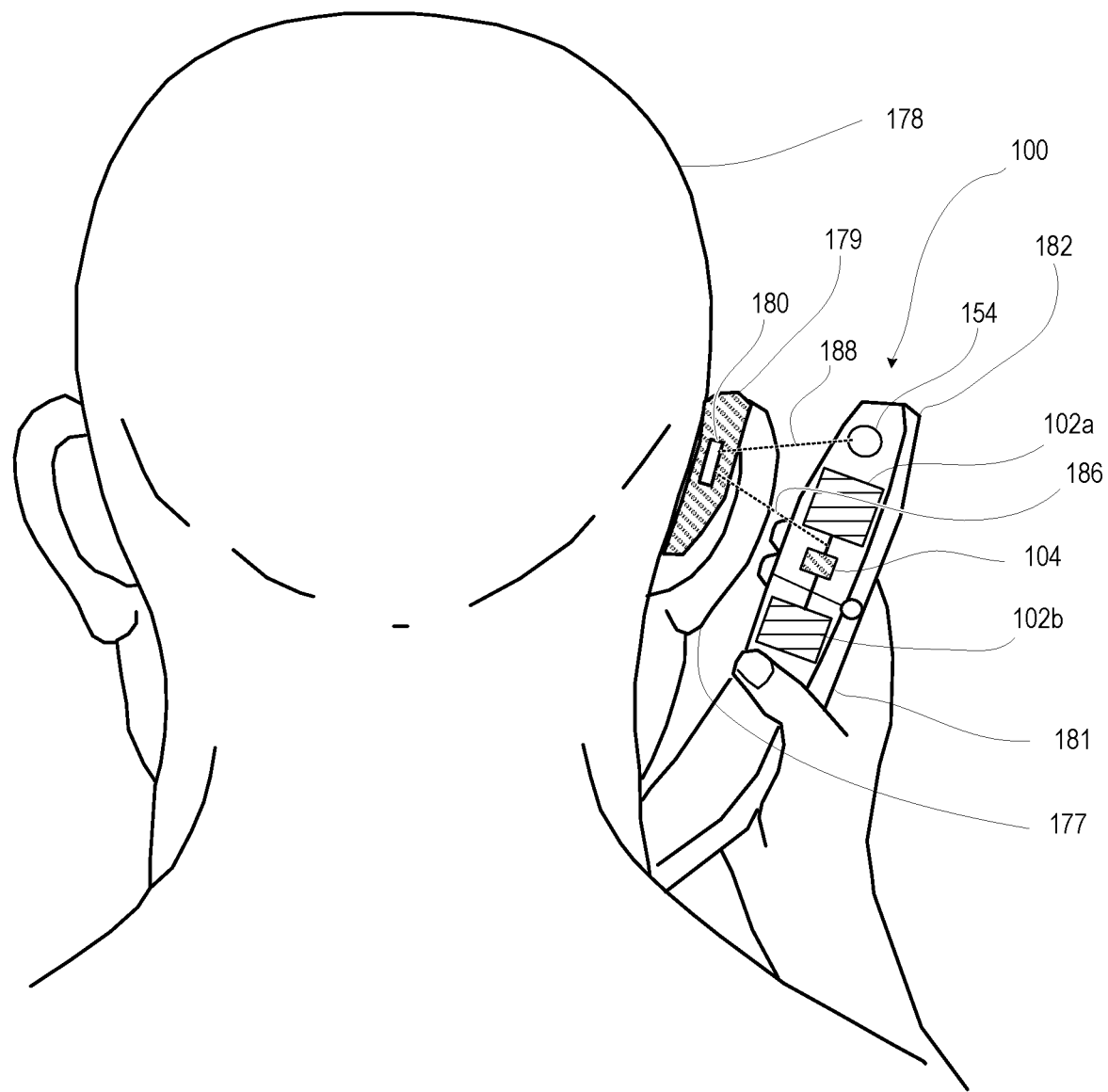
FIG. 2 illustrates a rear view of the communication device of FIG. 1 being positioned in proximity to an ear wearing a hearing aid, according to one or more embodiments.

FIG. 2 depicts flip battery 102a of communication device 100 being positioned in proximity to ear 177 of user 178 wearing hearing aid 179. Flip battery 102a in flip housing 182 augments stored power of base battery 102b in base housing 182. As audio output device 154 is brought close to ear 177 to privately convey audio output 188, emissions 186 that originate between flip and base batteries 102a-102b are also brought closer to hearing air telecoil 180. If emissions 186 are above HAC limits, emissions 186 can degrade operation of hearing aid 179. Switch 104 limits current flow between flip and base batteries 102a-102b to allow emissions 186 to remain within HAC limits. Controller 101 (FIG. 1) can also limit emissions to avoid interference with other types of sensitive equipment.

Figure 3:
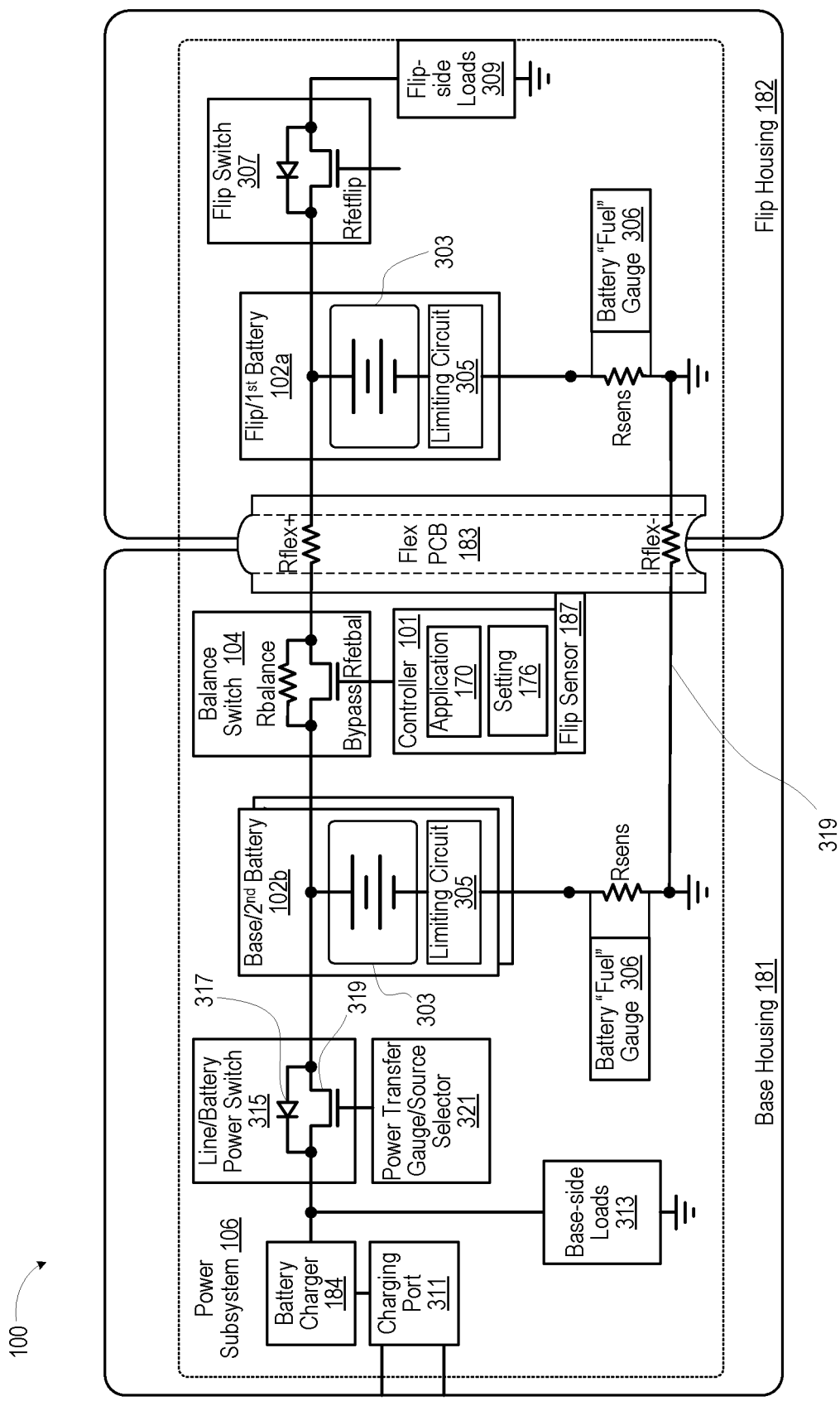
FIG. 3 illustrates a simplified electrical schematic of a power subsystem of the communication device of FIG. 1, according to one or more embodiments.

FIG. 3 depicts a simplified electrical schematic of example power subsystem 106 of communication device 100. Flip battery 102a (first battery) in flip housing 182 is an assembly that includes charge storage cell(s) 303 that are referenced to device ground via a serial combination of current limiting circuit 305 and current sensing resistor ("Rsens"). Battery "fuel" gauge 306 is electrically coupled across Rsens to detect a voltage drop across Rsens that corresponds to current flow through flip battery 102a. Similarly, one or more base batteries 102b are contained in base housing 181. Flip battery 102a is electrically coupled via flip switch 307 to flip-side (electrical) loads 309. Flip side loads 309 are turned off when flip housing 182 is in a closed position by flip switch 309. Flip switch 309 has a diode oriented to block current flow to flip side loads 309. A flip field effect transistor (FET) (Rfetflip) electrically couples flip side loads 309 to flip battery 102a when Rfetflip is activated. A FET consists of a channel of N- or P-type semiconductor material through which current can flow, with a different material (laid across a section of the channel) controlling the conductivity of the channel. One end of the channel is known as the source, the other end of the channel is called the drain, and the control mechanism is called the gate. By applying a voltage to the gate, the flow of current from the source to the drain is controlled. The presence or absence of a switch signal to the gate creates two electrical switch states of the FET.

Base housing 181 includes charging port 311 that is connectable to a source of electrical power provided to battery charger 184. Power from battery charger 184 is provided to base-side loads 313 and to a first terminal of line/battery power switch 315. Line/battery power module switch 315 includes diode 317 oriented to block current from battery charger 184 in parallel with a power module FET 319 that is selectively closed by power transfer gauge/source selector 321 when the electrical power is satisfactory. When electrically switched to a closed state, electrical power flows to at least base batteries 102b. According to aspects of the present disclosure, electrical power from battery charger 184 and/or base batteries 102b is selectively coupled or selectively limited to flip battery 102a. A series combination of switch 104 ("balance switch") and a conductive trace on flex circuit 183, depicted as flex printed circuit board (PCB), couples base batteries 102b to flip battery 102a. A ground path 319 between flex and base batteries 102a-102b also passes through flex circuit 183. In one or more embodiments, printed conductive traces on flex circuit 183 are electrically represented by resistors "Rflex+" and "Rflex-". Switch 104 includes an impedance component, such as an inductor and/or a resistor, depicted as resistor "Rbalance" that is electrically connected in parallel with bypass FET "Rfetbal". When bypass FET is open, a smaller amount of electrical current is allowed to pass between flex and base batteries 102a-102b than would pass through the lower impedance path of a closed bypass FET.

Based on expected differences in battery voltage between flex and base batteries 102a-102b, the amount of current that flows between flex and base batteries 102a-102b is less than limits prescribed for HAC. In one or more embodiments, bypass FET "Rfetbal" is a normally open FET that requires a gate voltage to be supplied by controller 101 in order to be closed. Thus, during assembly and repair of communication device 100, an amount of electrical current that passes between flex and base batteries 102a-102b is limited by Rbalance. For example, discharged new base batteries 102b could be installed in communication device 100 that has a charged flip battery 102a installed. Controller 101 executes multiple battery application 170 that responds to factors such as HAC/private settings 176 and position of flip housing 182 detected by flip sensor 141 to close or open bypass FET "Rfetbal".

In one or more embodiments, bypass FET Rfetbal of switch 104 is selectively configurable between a first state of high source to drain resistance that is substantially higher than a resistance of Rbalance and a second state of low source to drain resistance that is less than the impedance component of resistor Rbalance. Controller 101 selectively configures switch 104 to an open state by switching the bypass FET Rfetbal to the first state, enabling current flows between flip (first) battery 102a and the at least one base (second) battery 102b primarily through the impedance component of the resistor Rbalance. Controller 101 selectively configures switch 104 in the closed state by switching bypass transistor Rfetbal to the second state enabling the current to flow between flip (first) battery 102a and the at least one base (second) battery 102b primarily through bypass transistor Rfetbal.

Figure 4:
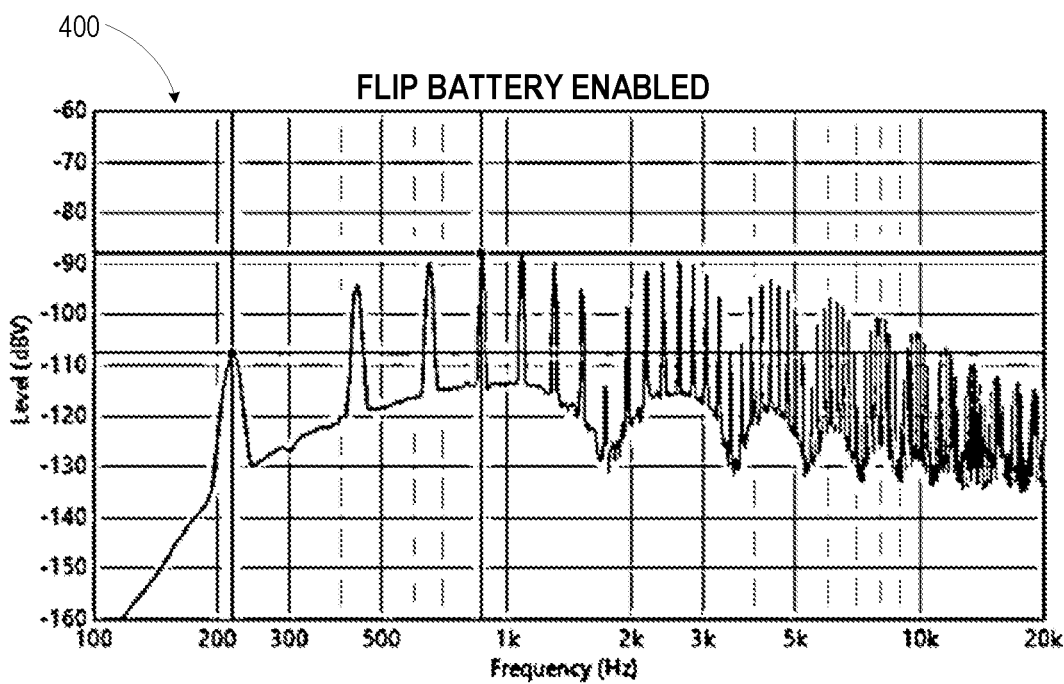
FIG. 4 illustrates a graphical plot of electromagnetic emissions from the communication device of FIG. 1 with a flip battery enabled, according to one or more embodiments.
Figure 5:
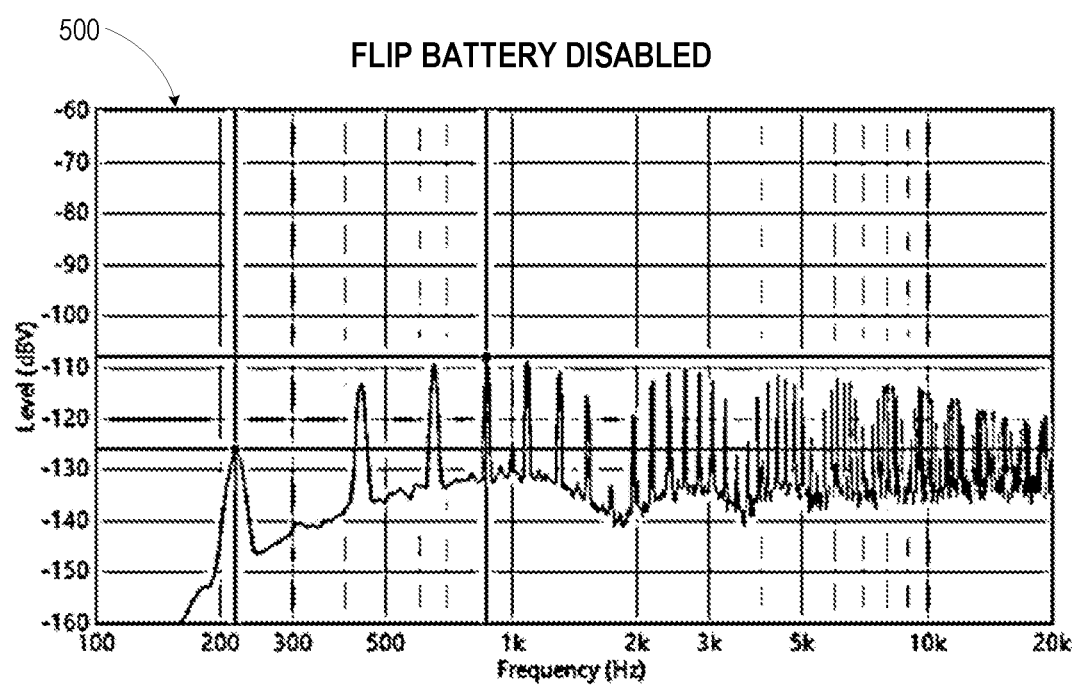
FIG. 5 illustrates a graphical plot of electromagnetic emissions from the communication device of FIG. 1 with the flip battery disabled, according to one or more embodiments.

FIG. 4 is a graphical plot 400 of electromagnetic emissions from the communication device with a flip battery enabled. FIG. 5 is a graphical plot of electromagnetic emissions from the communication device with the flip battery disabled according to aspects of the present disclosure. As shown by a comparison of plot 400 and plot 500, a significant reduction of 20+% dBV in emissions is realized with the flip battery 102a disabled from peaks of −90 dBm to peaks of −110 dBm. The lower values with the flip battery disabled are adequate for remaining within limits for HAC.

Figure 6A:
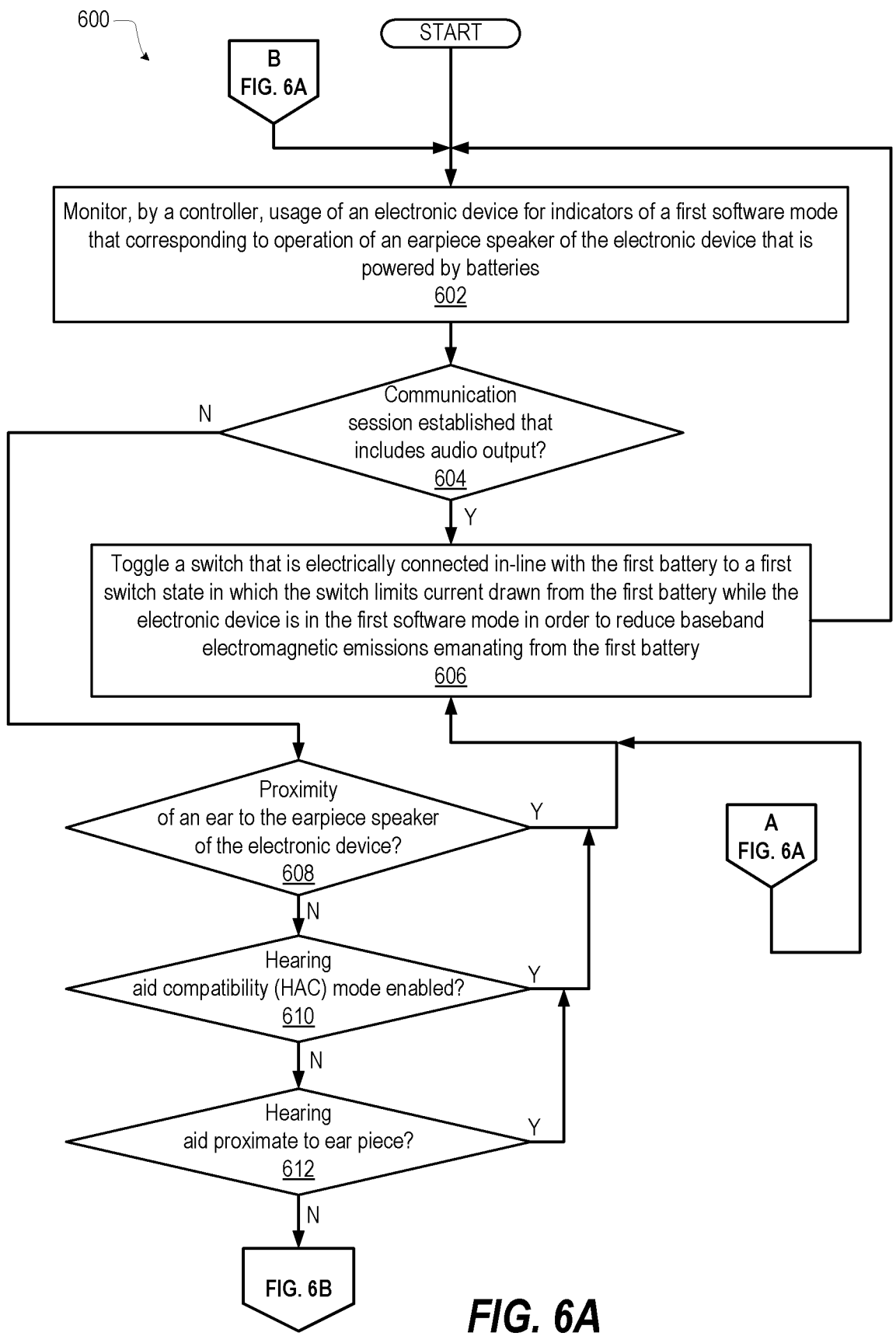
FIGS. 6A-6B (FIG. 6) present a flow diagram of a method for selectively limiting electromagnetic emissions of an electronic device having multiple batteries, according to one or more embodiments.

FIG. 6 presents a flow diagram of a method for limiting electromagnetic emissions of an electronic device having multiple batteries 102a-102b (FIG. 1). The description of method 600 is provided with general reference to the specific components illustrated within the preceding FIGS. 1-5. In at least one embodiment, method 600 can be implemented using controller 101 (FIG. 1) of an electronic device, such as communication device 100 (FIG. 1), that executes multiple battery application 170 (FIG. 1) to enable communication device 100 (FIG. 1) to perform the processes provided by method 600. With reference to FIG. 6A, method 600 includes monitoring, by a controller, usage of an electronic device for indicators that the device is about to be (or is being) utilized in a first software mode that corresponds to operation of an earpiece speaker of the electronic device that is powered by batteries (block 602). A first battery, such as flip battery 102a (FIG. 2), is positioned proximal to an earpiece speaker, such as audio output device 154 (FIG. 2), within the electronic device, such as communication device 100 (FIG. 2). At least one second battery, such as base battery 102b (FIG. 2), is positioned at a different location within the electronic device that is not proximal to the earpiece speaker.

One or more determinations (presented as decision blocks 604, 608, 610, 612, 614, 616) are made that indicate whether the first software mode is initiated. In one or more embodiments, a first determination is made, at decision block 604, whether a communication session is established that includes audio output. In response to determining that the communication session is established, method 600 includes toggling a switch 104 (FIG. 1) that is electrically connected in-line with the first battery to a first switch state (block 606). In the first switch state, the switch limits current drawn from the first battery while the electronic device is in the first software mode in order to reduce baseband electromagnetic emissions emanating from the first battery. Then, method 600 returns to block 602. In response to determining that the communication is not established, a determination is made, in decision block 608, whether proximity of an ear to the earpiece speaker is detected by a proximity sensor of the electronic device. In response to determining that the proximity of the ear to the earpiece speaker is detected, method 600 proceeds to block 606. In response to determining that the proximity of the ear to the earpiece speaker is not detected, a determination is made, in decision block 610, whether a HAC mode is enabled via user interface device of the electronic device. In response to determining that the HAC mode is enabled, method 600 proceeds to block 606. In response to determining that the HAC mode is not enabled, a determination is made, in decision block 612, whether a hearing aid is detected in proximity to the earpiece speaker by an antenna subsystem of the electronic device. In response to determining that the hearing aid is detected, method 600 proceeds to block 606.

Figure 6B:
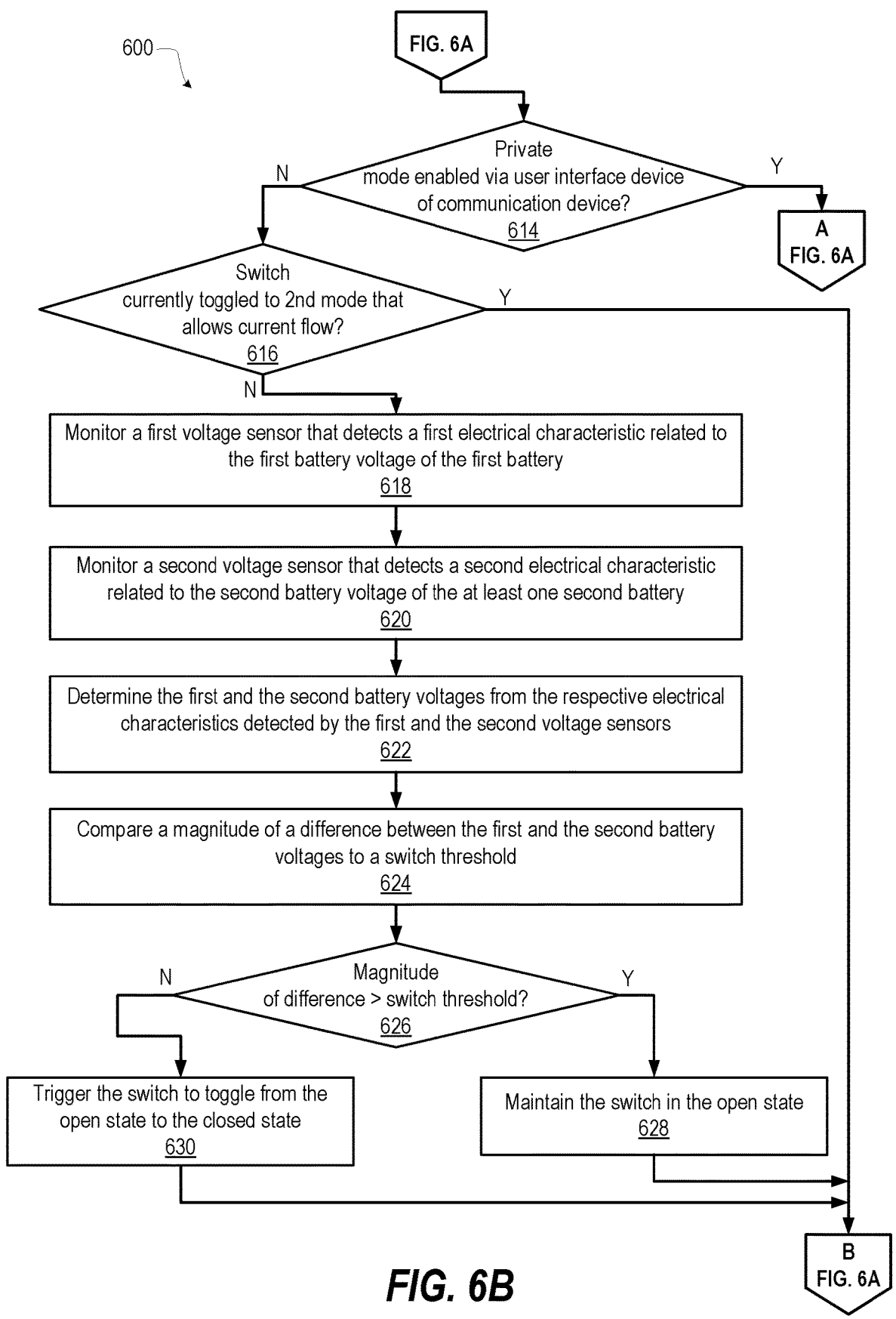

With reference to FIG. 6B, in response to determining that the hearing aid is not detected, a determination is made, in decision block 614, whether a private mode is enabled via the user interface device of the electronic device. In response to determining that the private mode is enabled, method 600 proceeds to block 606 (FIG. 6A). In response to determining that the private mode is not enabled, a determination is made, in decision block 616, whether the switch is currently toggled to a second state in which the switch allows the current drawn from, or drawn to, the first battery to flow from the one or more second batteries. In response to determining that the switch is currently toggled to the second state, method 600 returns to block 602. In response to determining that the switch is not currently toggled to the second state, but is in the first state, method 600 includes monitoring a first voltage sensor that detects a first electrical characteristic related to the first battery voltage of the first battery (block 618). Method 600 includes monitoring a second voltage sensor that detects a second electrical characteristic related to the second battery voltage of the at least one second battery (block 620). Method 600 includes determining the first and the second battery voltages from the respective electrical characteristics detected by the first and the second voltage sensors (block 622). Method 600 includes computing a difference between the first and the second battery voltages and comparing a magnitude of the difference to a switch threshold (block 624). Switch threshold can be defined as percentage of fully-charged battery, such as 2%, 5%, 10% or 20%, etc. A determination is made, in decision block 626, whether the magnitude of the difference is greater than the switch threshold. In response to the magnitude of the different being greater than the switch threshold, method 600 includes maintaining the switch in the first state (e.g., open state) (block 628). The first state of the switch has greater impedance than the second state, reducing the rate of current transference between batteries. The existing voltage difference between flip and base batteries 102a-102b is allowed to equalize over a longer period to avoid a spike in current level. The voltage imbalance could, for example, occur during a period of time in which the switch is in the first state. The voltage difference would be negligible if the switch was previously in the second state, which would have enabled voltage equalization. The second state can enable battery charging across the switch without excessive heat being generated. From block 628, method 600 returns to block 602. In response to the magnitude of the difference being less than or equal to the switch threshold, method 600 includes triggering the switch to toggle from the open state to the closed state (block 630). Method 600 returns to block 602.

In the above described flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
an earpiece speaker;
a plurality of batteries, with a first battery positioned proximal to the earpiece speaker within the electronic device and at least one second battery positioned at a different location within the electronic device that is not proximal to the earpiece speaker;
a switch electrically connected in-line with the first battery; and
a controller that is electrically connected to the switch and selectively toggles the switch between a first switch state and a second switch state, the controller initiating activation of a first software mode of the electronic device corresponding to operation of the earpiece speaker of the electronic device, and, in response to detecting the activation, toggles the switch to the first switch state in which the switch limits current drawn from the first battery while the electronic device is in the first software mode in order to reduce baseband electromagnetic emissions emanating from the first battery.

2. The electronic device of claim 1, wherein in response to one of (i) the electronic device entering into a second software mode and (ii) detecting termination of the first software mode of the electronic device, the controller further toggles the switch to the second switch state in which the switch allows the current drawn from the first battery to flow.

3. The electronic device of claim 2, wherein the controller initiates activation of the first software mode in response to one or more determinations from among: (i) a communication session is established that includes audio output; (ii) proximity of an ear to the earpiece speaker is detected by a proximity sensor of the electronic device; (iii) a hearing air compatibility (HAC) mode is enabled via user interface device of the electronic device; (iv) a hearing aid is detected in proximity to the earpiece speaker by an antenna subsystem of the electronic device; and (v) a private mode is enabled via the user interface device of the electronic device.

4. The electronic device of claim 2, further comprising:
a memory that stores a mode application and a current mode setting among the first software mode and the second software mode; and
the controller executing the mode application to enable the electronic device to:
in response to determining that the mode setting is the first software mode, configure the switch to the open state to limit electromagnetic noise due to the current flow to remain within a hearing aid compatibility (HAC) regulatory limit; and
in response to determining that the mode setting is the first mode, configure the switch to the closed state.

5. The electronic device of claim 1, further comprising:
an impedance component comprising at least one of: (i) a resistor; and (ii) an inductor that is electrically coupled in parallel with the switch and in-line between the first battery and the at least one second battery;
wherein the switch comprises a bypass transistor electrically coupled in parallel to the impedance component between the first and the at least one second battery, the bypass transistor selectively configurable between a first state of high source to drain resistance that is substantially higher than a resistance of the impedance component and a second state of low source to drain resistance that is less than the impedance component of the resistor; and
wherein the open state of the switch corresponds to the bypass transistor being in the first state and current flows between the first and the at least one second battery primarily through the impedance component; and the closed state of the switch corresponds to the bypass transistor being in the second state enabling the current to flow between the first and the at least one second battery primarily through the bypass transistor.

6. The electronic device of claim 5, wherein the bypass transistor comprises a field effect transistor (FET) in an inactive state having source to drain resistance that is greater than the electrical resistance of the impedance component, the FET having a gate terminal communicatively coupled to the controller, the controller providing a switching signal to the gate terminal of the FET to configure the FET to the second state wherein the FET has source to drain resistance that is less than the electrical resistance of the impedance component, the FET configured in the first state in response to the controller removing or not providing the switching signal to the gate terminal in response determining that HAC mode is ON.

7. The electronic device of claim 5, wherein the bypass transistor comprises a field effect transistor (FET) in an inactive state having source to drain resistance that is greater than the electrical resistance of the impedance component, the FET having a gate terminal communicatively coupled to the controller, the controller providing a switching signal to the gate terminal of the FET to configure the FET to the second state wherein the FET has source to drain resistance that is less than the electrical resistance of the impedance component, the FET configured in the first state in response to the controller being inactive during assembly or repair of the electronic device in which one of the first battery and the at least one second battery can have a different level of charge warranting a limit on current transfer during initial electrical connection.

8. The electronic device of claim 1, further comprising:
a first voltage sensor that detects a first electrical characteristic related to the first battery voltage of the first battery; and a second voltage sensor that detects a second electrical characteristic related to the second battery voltage of the at least one second battery;
wherein the controller is communicatively coupled to the first voltage sensor and the second voltage sensor, and to enable the electronic device to configure the switch to the closed state, the controller:
determines the first and the second battery voltages from the respective electrical characteristics detected by the first and the second voltage sensors;
compares a magnitude of a difference between the first and the second battery voltages to a switch threshold; and
selectively triggers the switch to toggle between the open state and the closed state or to remain in one of the open state and the closed state based on a value of the magnitude of the difference compared to the switch threshold.

9. The electronic device of claim 8, wherein in selectively triggering the switch, the controller:
in response to the magnitude of the difference being greater than the switch threshold:
identifies whether the switch is in the closed state; and
in response to the switch being in the closed state, triggers the switch to toggle to the open state; and
in response to the switch being in the open state, maintains the configuration of the switch in the open state; and
in response to the magnitude of the difference being less than or equal to the switch threshold, triggers the switch to toggle between the open state and the closed state.

10. The electronic device of claim 1, further comprising:
a base housing that contains the at least one second battery that is constrained in size by dimensions of the base housing;
a movable housing containing the first battery having additional charge storage that augments the at least one second battery in an electrical parallel arrangement, the movable housing positionably coupled to the base housing between a closed position and an open position, the movable housing comprising the earpiece audio device that is placed to an ear of a user during a communication session in the private mode operation; and
a housing sensor positioned to detect the closed position and the open position of the movable housing;
wherein the controller is communicatively coupled to the ear piece audio device and the housing sensor, and the controller enables the electronic device to configure the bypass transistor to the open state further in response to determining, via the housing sensor, that the movable housing is in the open position.

11. The electronic device of claim 1, further comprising a hearing aid telecoil communicatively coupled to the controller, the first software mode comprising hearing aid compatibility (HAC) mode is ON, the controller enabling the electronic device to:
in response to determining that the HAC mode setting is OFF, generate an audio output via the earpiece audio device during the communication session; and
in response to determining that the HAC mode setting is ON, transmit an audio signal via an inductive coupling of the hearing aid telecoil of the electronic device to the telecoil of the hearing aid.

12. A method comprising:
initiating activation of a first software mode of an electronic device corresponding to operation of an earpiece speaker of the electronic device that is powered by a plurality of batteries, with a first battery positioned proximal to the earpiece speaker within the electronic device and at least one second battery positioned at a different location within the electronic device that is not proximal to the earpiece speaker; and
in response to detecting the activation, toggling a switch electrically connected in-line with the first battery to a first switch state in which the switch limits current drawn from the first battery while the electronic device is in the first software mode in order to reduce baseband electromagnetic emissions emanating from the first battery.

13. The method of claim 12, further comprising, in response to one of (i) the electronic device entering into a second software mode and (ii) detecting termination of the first software mode of the electronic device, toggling the switch to a second switch state in which the switch allows the current drawn from the first battery to flow.

14. The method of claim 13, wherein initiating activation of the first software mode is in response to one or more of: (i) determining that a communication session is established that includes audio output; (ii) detecting proximity of an ear to the earpiece speaker by a proximity sensor of the electronic device; (iii) determining that a hearing air compatibility (HAC) mode is enabled via user interface device of the electronic device; (iv) detecting a hearing aid that is in proximity to the earpiece speaker by an antenna subsystem of the electronic device; and (v) determining that a private mode is enabled via the user interface device of the electronic device.

15. The method of claim 13, further comprising:
in response to determining that the mode setting is the first software mode, configuring the switch to the open state to limit electromagnetic noise due to the current flow to remain within a hearing aid compatibility (HAC) regulatory limit; and
in response to determining that the mode setting is the first mode, configuring the switch to the closed state.

16. The method of claim 12, wherein:
an impedance component comprising at least one of: (i) a resistor; and (ii) an inductor is electrically coupled in parallel with the switch and in-line between the first battery and the at least one second battery;
the switch comprises a bypass transistor electrically coupled in parallel to the impedance component between the first and the at least one second battery, the bypass transistor selectively configurable between a first state of high source to drain resistance that is substantially higher than a resistance of the impedance component and a second state of low source to drain resistance that is less than the impedance component of the resistor;
configuring the switch to the open state comprises switching the bypass transistor to the first state enabling current flows between the first and the at least one second battery primarily through the impedance component; and
configuring the switch in the closed state comprises switching the bypass transistor to the second state enabling the current to flow between the first and the at least one second battery primarily through the bypass transistor.

17. The method of claim 12, further comprising:
monitoring a first voltage sensor that detects a first electrical characteristic related to the first battery voltage of the first battery;

monitoring a second voltage sensor that detects a second electrical characteristic related to the second battery voltage of the at least one second battery;

determining the first and the second battery voltages from the respective electrical characteristics detected by the first and the second voltage sensors;

comparing a magnitude of a difference between the first and the second battery voltages to a switch threshold;

in response to the magnitude of the difference being greater than the switch threshold:
identifying whether the switch is in the closed state;
in response to the switch being in the closed state, triggering the switch to toggle to the open state; and
in response to the switch being in the open state, maintaining the configuration of the switch in the open state; and in response to the magnitude of the difference being less than or equal to the switch threshold, triggering the switch to toggle between the open state and the closed state.

18. A computer program product comprising:
a non-transitory computer readable storage device; and
program code on the non-transitory computer readable storage device that when executed by a processor associated with an electronic device including an earpiece speaker, including a plurality of batteries, with a first battery positioned proximal to the earpiece speaker within the electronic device and at least one second battery positioned at a different location within the electronic device that is not proximal to the earpiece speaker, and including a switch electrically connected in-line with the first battery, the program code enables the electronic device to provide functionality of:
initiating activation of a first software mode of the electronic device corresponding to operation of the earpiece speaker; and
in response to detecting the activation, toggling the switch to a first switch state in which the switch limits current drawn from the first battery while the electronic device is in the first software mode in order to reduce baseband electromagnetic emissions emanating from the first battery.

19. The computer program product of claim 18, wherein the program code enables the communication device to provide the functionality of:
in response to one of (i) the electronic device entering into a second software mode and (ii) detecting termination of the first software mode of the electronic device, toggling the switch to a second switch state in which the switch allows the current drawn from the first battery to flow; and
in response to determining that the mode setting is the first software mode, configuring the switch to the open state to limit electromagnetic noise due to the current flow to remain within a regulatory limit.

20. The computer program product of claim 18, wherein the program code enables the communication device to provide the functionality of initiating activation of the first software mode is in response to one or more of: (i) determining that a communication session is established that includes audio output; (ii) detecting proximity of an ear to the earpiece speaker by a proximity sensor of the electronic device; (iii) determining that a hearing air compatibility (HAC) mode is enabled via user interface device of the electronic device; (iv) detecting a hearing aid that is in proximity to the earpiece speaker by an antenna subsystem of the electronic device; and (v) determining that a private mode is enabled via the user interface device of the electronic device.

* * * * *